(No Model.)
H. A. TOBEY.
PRESSURE REGULATOR.
No. 263,996. Patented Sept. 5, 1882.
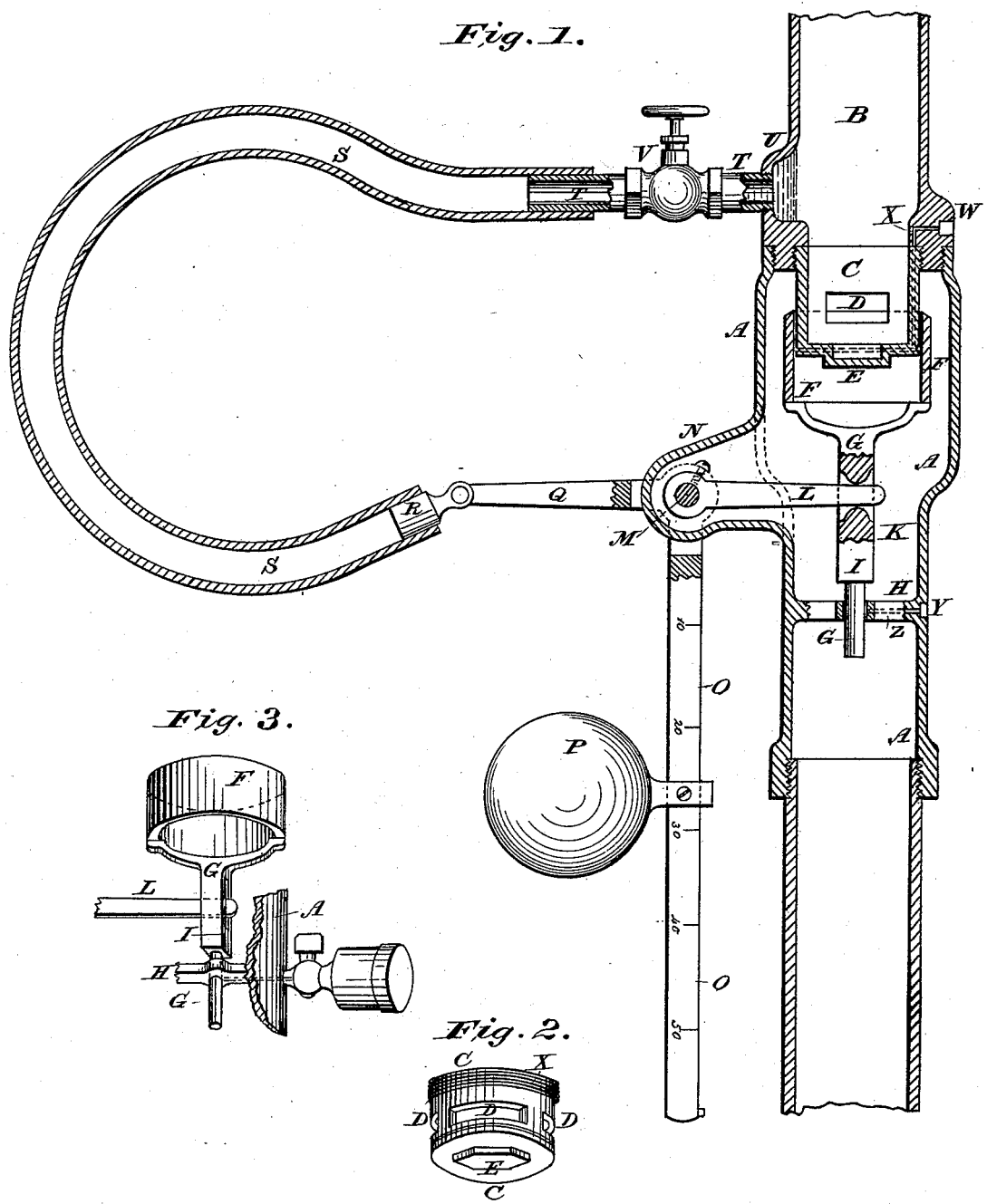
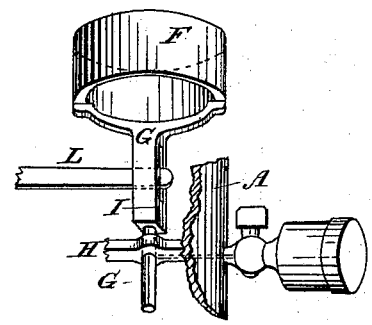
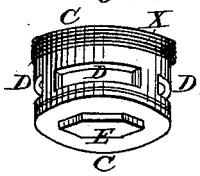
WITNESSES
T. C. Brecht
Jno. R. Young
INVENTOR
Henry A. Tobey
by W. H. Doolittle
Attorney

UNITED STATES PATENT OFFICE.

HENRY A. TOBEY, OF DAYTON, OHIO.

PRESSURE-REGULATOR.

SPECIFICATION forming part of Letters Patent No. 263,996, dated September 5, 1882.

Application filed February 6, 1882. (No model.)

*To all whom it may concern:*

Be it known that I, HENRY A. TOBEY, a citizen of the United States, residing at Dayton, in the county of Montgomery and State of Ohio, have invented certain new and useful Improvements in Pressure-Regulators; and I do hereby declare the following to be a full, clear, and exact description of the invention, such as will enable others skilled in the art to which it appertains to make and use the same.

Reference is made to the accompanying drawings, forming part of this specification, in which similar letters of reference indicate corresponding parts in all the figures.

Figure 1 is a sectional side elevation of my improvement. Fig. 2 is a perspective view of the valve-seat detached. Fig. 3 is a perspective view of the valve.

The general object of my invention is to hold fluids, vapors, or gases passing through a suitable chamber or pipe at any desired pressure, whatever may be the initial pressure from the generating or containing vessel.

I have devised special means for carrying my invention into effect, consisting of the following features in combination: first, a flexible bent tube operated by pressure of an inflowing medium and a valve for controlling the admission of this medium into a receiving-chamber, which valve is operated by said flexible tube; second, a valve-chamber and valve, a receiving-chamber, the flexible bent tube connected with the receiving-chamber, and a lever connecting the flexible bent tube and the valve, whereby the valve will be closed to shut off the inflowing medium by pressure; third, the valve-chamber, the valve, the receiving-chamber, a three-armed lever, a balancing-weight suspended from an arm of the lever, and the bent flexible tube suspended at one end from an arm of the lever and connected at its other end with the receiving-chamber, whereby the valve will be operated automatically to maintain a uniform pressure in the receiving-chamber; fourth, the valve-chamber, the valve-stem having a shoulder, and a guide-bar, whereby the valve-stem is made to move in a straight line and the movement of the valve is limited in one direction; fifth, the valve-chamber having a bulge or projection in the lower part of its shell, whereby the upper arm of the three-armed lever is lengthened and a slight movement of the three-armed lever made to effect a longer movement of the valve; sixth, a receiving-chamber having a bulge or depression in the lower part of its shell, whereby the liquid of condensation, when gases or vapors constitute the inflowing medium, will be guided into the bent flexible tube; and, seventh, the receiving-chamber having bulge or projection, the bent flexible tube, and a short pipe and its valve, whereby the connection between the receiving-chamber and the flexible tube can be closed, all of which will be hereinafter more fully described.

A represents the valve-chamber, the shell of which is screwed upon the shell of the receiving-chamber B. Into the inner end of the receiving-chamber B is screwed the outer end of the valve-seat C, which is made in the form of a hollow cylinder, with its outer end open, its inner end closed, and apertures D in its sides for the passage of the inflowing medium.

Upon the closed forward end of the valve-seat C is formed a six-sided projection, E, to receive a wrench for screwing the valve-seat C into and out of place; but this projection may be varied in form or omitted altogther.

Upon the valve-seat C fits and slides the valve F, so that the apertures D can be opened and closed more or less by the movement of the valve F.

The valve-stem G passes through a guide-aperture in an arm or bar, H, formed upon the walls of the valve-chamber A, and the movement of the valve is limited in one direction by a shoulder, I, formed upon the valve-stem G, and which comes in contact with the guide-arm H, and in the other direction by the valve coming in contact with the inner end of chamber B.

In the valve-stem G is formed a short slot, K, through which passes the upper end of an arm, L, the lower end of which enters a downward bulge, projection, or enlargement, N, of the valve-chamber A, and is rigidly attached to a short shaft, M. The shaft M passes through and works in stuffing-boxes in the sides of the bulge or projection N of the lower side of the valve-chamber A. The projection N allows the arm L to be made longer with a given diameter of the valve-chamber A than would otherwise be possible, and thus allows a slight movement of the shaft M to move the valve F farther than if a shorter arm than L were used.

To one end of the shaft M is rigidly attached the end of an arm, O, which projects at right angles with the arm N and carries an adjustable weight, P. The arm O is graduated, and the division-marks are designated with numbers representing the amount of pressure the weight P will balance when placed at the points thus marked and numbered.

To an end of the shaft M is rigidly attached the upper end of a downwardly-projecting arm, Q, which is thus at right angles with the arm O and in the same plane with the arm L. The arms L O Q, being rigidly connected, form a three-armed lever.

If desired, the ends of the arms O Q can be forked, and thus attached to both ends of the shaft M, so as to act squarely upon the said shaft.

To the lower end of the arm Q is hinged a plug, R, which is firmly fastened in the end of a short rubber hose or other flexible tube, S. The other end of the flexible tube S is fastened to the end of a short pipe, T, the upper end of which pipe is secured in the bulge or depression U of the discharging-chamber B. The flexible tube S, connecting arm Q and pipe T, is bent into the form of an arc, so that when pressure is applied from the receiving-chamber upon the tube the tendency of said pressure is to straighten the tube, and lateral motion is thus obtained which, applied to arm Q, communicates a corresponding lateral movement to valve F. The pipe T is provided with a globe-valve, V, or other suitable valve, so that the said pipe T can be closed when desired. By this construction the flexible tube S will be filled with the liquid condensation from the chamber B when gases or vapors are used and directed into the said tube by the depression or bulge U in the lower side of the said chamber. A pressure will also be exerted upon the liquid in the tube S, the effect of which tends, as before stated, to straighten the tube, which tendency is resisted by the gravity of the weight P, suspended from the arm O of the three-armed lever, and thus is controlled the amount of pressure desired to move the valve. When, for instance, the pressure in the receiving-chamber B becomes greater or less than the amount for which the weight P is set, the pressure will overbalance or be overbalanced by this weight, and the three-armed lever Q O L will be moved to close or open the valve F and lessen or increase the amount of the inflowing medium admitted to the receiving-chamber B, and thus lessen or increase the pressure within the said chamber, so that the pressure in the chamber B will be maintained at the desired point regardless of the pressure in valve-chamber A.

W is a hole formed in the shell of the chamber B to receive an oil-cup, and from which a passage, X, leads through the shell of the said chamber and through the valve-seat C, and communicates with a ring-groove in the surface upon which the valve F slides, so as to keep the friction-surfaces of the valve and valve-seat lubricated.

Y is a hole formed in the shell of the valve-chamber A to receive an oil-cup, as shown in Fig. 3, and from which a passage, Z, leads through the bar H to the guide-bearing of the valve-stem G, so as to keep the said bearing lubricated.

Having thus fully described my invention, I claim as new and desire to secure by Letters Patent—

1. The receiving-chamber B, the valve-seat C, of the form described, and provided with apertures D on its sides, the valve F, sliding on the said valve-seat, the guide-stem G, having a slot, K, and a shoulder, I, the bar H, having a guide-aperture extending from walls of chamber A, in combination with said chamber A, the three-armed lever, and flexible tube, substantially as described.

2. The combination of the valve stem G, provided with slot K, the arm L, working in said slot and rigidly attached to shaft M, the valve-chamber A, provided with depression N, the short shaft M, working in stuffing-boxes in depression N, the graduated arm O and weight P, and the outwardly-projecting arm L, rigidly attached to end of shaft M, substantially as described.

3. The receiving-chamber B, having depression U, emptying into short pipe T, the upper end of which terminates at the bottom of said part U, the valve V, located in pipe T, and the flexible tube S, substantially as and for the purpose described.

In testimony whereof I affix my signature in presence of two witnesses.

HENRY A. TOBEY.

Witnesses:
GEO. S. SWARTZELL,
JNO. R. YOUNG.